United States Patent [19]

Wombwell et al.

[11] Patent Number: 5,523,044
[45] Date of Patent: Jun. 4, 1996

[54] PROCESS FOR MOLDING EPOXY RESINS WITH COARSE DECORATIVE PARTICLES

[75] Inventors: Paul T. Wombwell, Melbourn; Philip D. Willis, Bishops Stortford; Peter B. Ludman, Gt Wilbraham, all of United Kingdom

[73] Assignee: Ciba-Geigy Corporation, Tarrytown, N.Y.

[21] Appl. No.: 259,642

[22] Filed: Jun. 14, 1994

[30] Foreign Application Priority Data

Jun. 19, 1993 [GB] United Kingdom ............. 9312712

[51] Int. Cl.⁶ .................... B29C 45/34; B29K 105/16
[52] U.S. Cl. .................. 264/328.8; 264/328.9; 264/328.13; 264/328.18
[58] Field of Search ................ 264/328.8, 328.9, 264/328.13, 328.18

[56] References Cited

FOREIGN PATENT DOCUMENTS

| | | |
|---|---|---|
| 0333456 | 3/1989 | European Pat. Off. . |
| 2073214 | 9/1971 | France . |
| 1298903 | 12/1972 | United Kingdom . |
| 2013555 | 8/1979 | United Kingdom . |
| 2023488 | 1/1980 | United Kingdom . |
| 2216841 | 10/1989 | United Kingdom . |

OTHER PUBLICATIONS

Derwent 80–79920 c.
Patent Abstracts of Japan (57–63235 (A)).

*Primary Examiner*—D. R. Wilson
*Attorney, Agent, or Firm*—William A. Teoli, Jr.; David R. Crichton

[57] ABSTRACT

The present invention provides a process for the manufacture of a moulded article which comprises introducing a curable epoxy resin composition to a mould which is at a temperature high enough to initiate curing of the resin and supplying further resin under pressure to compensate for shrinkage of the composition, the epoxy resin containing coarse decorative particles therein, wherein the epoxy resin is introduced into the mould through a gap having a length which is 30 to 100% of that dimension of the moulded product being made which is adjacent to the gap and a width which is at least twice the maximum size of the decorative particles.

6 Claims, 1 Drawing Sheet

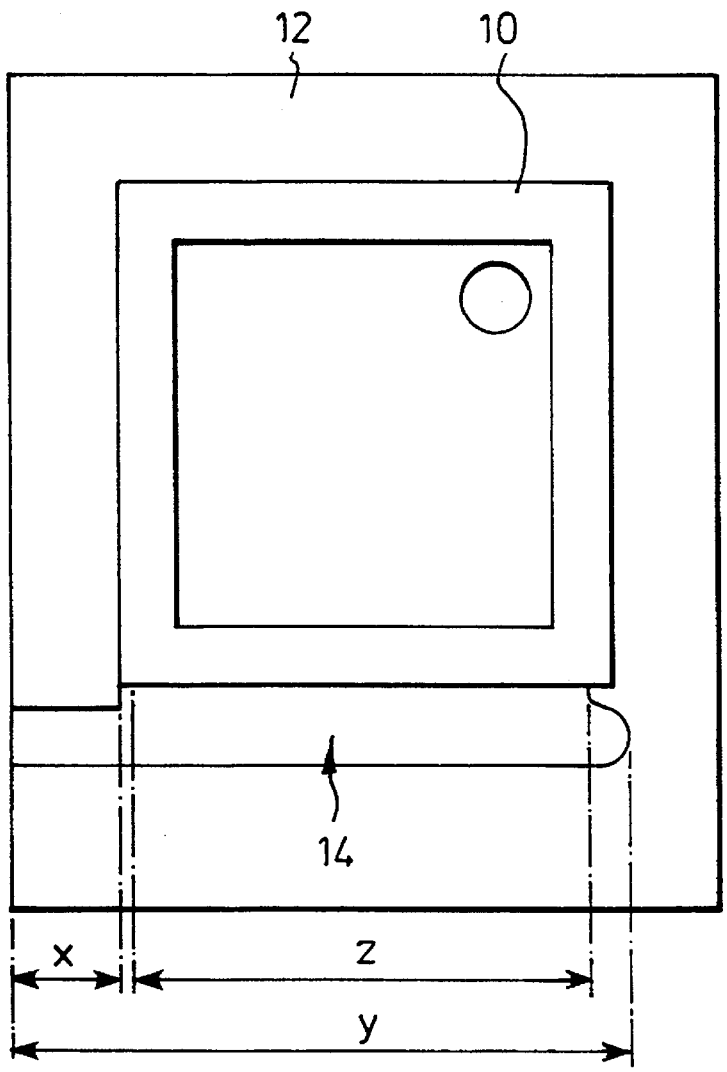
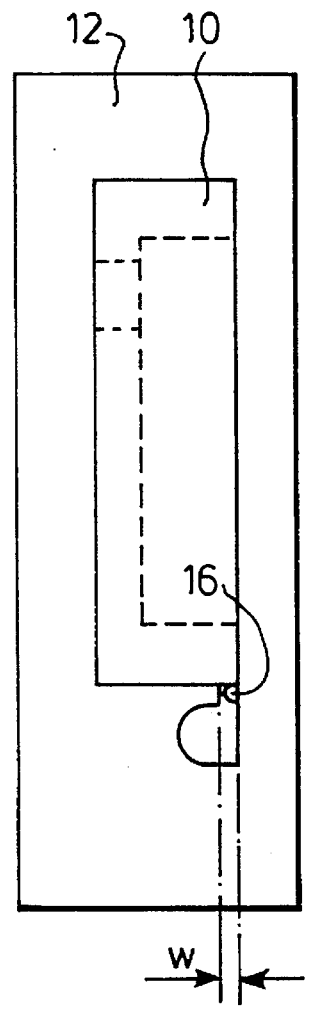
FIG.1
FIG.2

PROCESS FOR MOLDING EPOXY RESINS WITH COARSE DECORATIVE PARTICLES

The present invention relates to a process for the manufacture of epoxy resin castings having essentially lamellar geometry which have coarse decorative particles evenly distributed throughout the material.

Epoxy resins can be used to make moulded articles by what is called the Automatic Pressure Gelation process (APG). In this process which is described for example in GB 1323343 and EP 0333456 an epoxy resin and curing agent are mixed at a temperature at which they are liquid, usually 40°–60° C. The mixture is then passed, under a pressure of 4 to 42 psi, into a mould which is at a high enough temperature for gelling and curing to take place. Further mixture is supplied to the mould under the application of pressure to compensate for shrinkage of the composition until the composition has set.

When epoxy resins are used to make moulded articles in the APG process, the finished product usually contains one or more fillers. These are added to the resin or to the resin/curing agent mixture, before curing. Fillers can be organic or inorganic and are used for various reasons for example as a modifying agent, to improve abrasion resistance, to give special effects or as a bulking agent. When using a filler to produce a decorative effect, such as a granite-type effect, large particle sizes are usually needed.

While it is possible to ensure that the epoxy resin mixture, before moulding, has an even distribution of filler (see for example EP 0533465) the resulting moulding does not always have the decorative particles evenly distributed.

We have now found a way to ensure that the evenly dispersed resin/hardener/filler/decorative particle blend does not lose the even dispersion during either the injection and filling of the mould or during gelation in the mould.

We have found that this can be achieved if the injection of material is such that the entry velocity into the mould is minimised, and any turbulence as the material flows through the inlet gap into the mould is also minimised. However, filling of the mould cavity must be completed in a time which ensures economic production of perfect castings.

This can be achieved by using a longer inlet channel through which the liquid resin flows into the mould, than is normally used.

Accordingly the present invention provides a process for the manufacture of a moulded article which comprises introducing a curable epoxy resin composition to a mould which is at a temperature high enough to initiate curing of the resin and supplying further resin under pressure to compensate for shrinkage of the composition, the epoxy resin containing coarse decorative particles therein, wherein the epoxy resin is introduced into the mould through a gap having a length which is 30 to 100% of the corresponding dimension of the moulded product being made which is adjacent to the gap and a width which is at least twice the maximum size of the decorative particles.

That dimension of the moulded product adjacent to the inlet gap is normally its width and is referred to as such in the remainder of this specification.

The gap through which the resin is introduced into the mould preferably has a length of 60 to 100% of the width of the mould. The maximum width of the inlet gap is preferably not greater than the thickness of the casting. In the case of thin castings, for example for kitchen sinks, the maximum width of the inlet gap is preferably 10 mm or the thickness of the casting, whichever is the least, and most preferably less than 5 mm.

In practice the width of the inlet gap needs to be wide enough to give reduced velocity and turbulence but narrow enough to ensure that the final casting can be easily removed from the mould and from the cured resin in the feed runner and then fettled.

The bottom runner, or channel through which the resin is provided to the mould is at least as long as the length of the inlet gap and may be as long as the width of the product being made, plus the length of the distance between the edge of the product being made and the outside of the whole mould.

A wide range of fillers may be used, both fine and coarse particles. The filler may be inorganic such as clays, silica, chalk, mica powder, glass powder, glass beads, powdered glass fibre, aluminium hydroxide and magnesium hydroxide, or organic such as powdered poly(vinyl chloride), nylon, polyethylene, polyester or fully or partially cured thermoset resins, e.g. epoxy resins.

In general fillers having a particle size of from 0.01 to 10 mm may be used, preferably from 0.05 to 4 mm. The total amount of filler may be up to 400 parts by weight per 100 parts by weight of epoxy resin, preferably up to 300 parts by weight.

Mixtures of fillers may be used. For example in order to give a granite-like effect in the moulded product a mixture of calcined china clay and black mica of relatively large particle size may be used. In the case of the manufacture of kitchen sinks and the like, the maximum size of the decorative particles is usually up to 1 mm, preferably up to 0.8 mm, for instance about 0.5 mm.

The epoxide resin may be a cycloaliphatic epoxide resin, i.e. a resin which has a least one epoxide group in which the oxygen atom is attached to carbon atoms in a cycloaliphatic ring, a N-glycidylamine, a polyglycidyl ester of a polycarboxylic acid or a polyglycidyl ether of a polyhydric alcohol or phenol. The curing agent for the epoxide resin may be a cycloaliphatic or aromatic polyamine, a polyhydric phenol, a polycarboxylic acid anhydride, or a catalytic curing agent such as a boron trifluoride-amine complex or an imidazole. Preferred resin compositions include those comprising at least one polyglycidyl ether of a polyhydric phenol such as 2,2-bis(4-hydroxyphenyl)propane (bisphenol A), bis(4-hydroxyphenyl)methane (bisphenol F), a phenol formaldehyde novolak or a cresol-formaldehyde novolak, and as curing agent, a polycarboxylic acid anhydride such as phthalic anhydride, tetrahydrophthalic anhydride, methyltetrahydrophthalic anhydride, hexahydrophthalic anhydride, methylhexahydrophthalic anhydride, methylendomethylenetetrahydrophthalic anhydride, alkenylsuccinic anhydrides, maleic anhydride, succinic anhydride, glutaric anhydride or fumaric anhydride.

Epoxide resin compositions used in the method of the invention may also include an accelerator for the cure of the resin with the chosen curing agent. Accelerators suitable for the cure of an epoxide resin with a particular curing agent are well known to those skilled in the an of curing epoxide resins.

Other additives conventionally employed in moulding resin compositions may also be included in the composition. Examples of such additives are pigments, dyes, fibres such as glass and carbon fibres, flame retardants, antioxidants, light stabilisers, UV absorbers and surfactants.

Examples of suitable antioxidants include alkylated monophenols, alkylthiomethylphenols, hydroquinones and alkylated hydroquinones, hydroxylated thiodiphenyl ethers, alkylidenebisphenols, O-, N- and S-benzyl compounds, hydroxybenzylated malonates, hydroxybenzyl aromatics, triazine compounds, benzylphosphonates, acylaminophenols, esters and amides of β3-(3,5-di-tert-butyl-4-hydroxyphenyl) propionic acid, esters of β3-(5-tert-butyl-4-hydroxy-3-methylphenyl) propionic acid, esters of β-(3,5-dicyclohexyl-4-hydroxyphenyl) propionic acid, esters of 3,5-di-tert-butyl-4-hydroxyphenyl acetic acid.

Examples of suitable UV absorbers and light stabilisers include 2-(2'-hydroxyphenyl) benzotriazoles, 2-hydroxybenzophenones, esters of substituted and unsubstituted benzoic acids, acrylates, nickel compounds, sterically hindered amines, oxalic acid diamides and 2-(2-hydroxyphenyl)-1,3,5-triazines.

The compositions may also contain a thixotropic agent and/or a thickening polymer.

The compositions of the invention may be used for the production of mouldings having thin or thick walls (cross sections). They are also particularly suitable for the production of mouldings having a large surface area, at least one large linear dimension or a complex shape. The compositions may be used, for instance, in the moulding of domestic sanitary ware such as sinks, baths, shower trays and basins, vanity units and sheet slabstock for use in the production of articles such as domestic worktops.

The invention is illustrated by the following Examples in which "parts" are parts by weight.

BRIEF DESCRIPTION OF THE DRAWINGS

FIG. 1 is a flat view of a mold to produce a kitchen sink which shows the inlet gap length.

FIG. 2 is an end view of a mold to produce a kitchen sink which shows the inlet gap width.

EXAMPLE 1

Kitchen sinks are made using an epoxy resin composition containing 100 parts liquid modified bisphenol A epoxy resin with an epoxy content of 5.2 mol/kg; 200 parts finely divided silica; 60 parts coarse calcined china clay; 10 parts black mica and 21 parts liquid methyltetrahydro-phthalic anhydride hardener. The sinks are made using a mould as illustrated in FIGS. 1 and 2 of the accompanying drawings.

In the drawings, kitchen sink 10 is made in mould 12 using an inlet runner 14 of the size given below and providing an inlet gap 16 having a length and width of the sizes given below. The value of x is also given below.

|  | Short runner | Long runner |
| --- | --- | --- |
| Sink width | 50 cm | 50 cm |
| Runner length y | 21.5 cm | 57 cm |
| Inlet gap length z | 10 cm | 46 cm |
| Inlet gap width w | 1.5 mm | 1.5 mm |
| Length x | 9 cm | 9 cm |
| Maximum particle size of decorative filler | 0.6 mm | 0.6 mm |
| Sink appearance | Very few particles on L.H. filling side of sink. Very few particles visible on bottom rim. Also some areas with over population of particles. | Distribution of particles over sink uniform. No areas look over populated. |

EXAMPLE 2

Example 1 is repeated using moulds having the dimensions given below.

|  | Short runner | Long runner |
| --- | --- | --- |
| Sink width | 50 cm | 50 cm |
| Runner length y | 22 cm | 48 cm |
| Inlet gap length z | 7 cm | 32.5 cm |
| Inlet gap width w | 2.5–3.0 mm | 3.0 mm |
| Length x | 12 cm | 12 cm |
| Maximum particle size of decorative filler | 0.8 mm | 0.8 mm |
| Sink appearance | Sink has areas of both too few and too many particles. Too few particles on L.H. filling side and on bottom rim. | Uniform particle distribution over whole sink. |

EXAMPLE 3

|  | Long runner | Long runner |
| --- | --- | --- |
| Sink width | 51 cm | 51 cm |
| Runner length y | 60 cm | 60 cm |
| Inlet gap length z | 50 cm | 50 cm |
| Inlet gap width w | 1.2 mm | 3.0 mm |
| Length x | 9 cm | 9 cm |
| Maximum particle size of decorative filler | 0.7 mm | 0.7 mm |
| Sink appearance | General appearance of sink satisfactory, but some areas of poor particle distribution around inlet area. | Uniform particle distribution over the whole sink. |

It can be seen from the above Examples that both a long inlet gap and an inlet gap width of at least twice the maximum size of the decorative particles are necessary in order to ensure uniform particle distribution over the whole sink.

We claim:

1. A process for the manufacture of a moulded article which comprises introducing a curable epoxy resin composition under a pressure of 4–42 psi to a mould which is at a temperature high enough to initiate curing of the resin and supplying further resin under pressure to compensate for shrinkage of the composition, the epoxy resin containing, in an effective amount, coarse decorative particles having a particle size of from 0.01 to 10 mm therein, wherein the epoxy resin is introduced into the mould through a gap having a length which is 30 to 100% of the corresponding dimension of the moulded product being made which is adjacent to the gap and a width which is at least twice the maximum size of the decorative particles.

2. A process as claimed in claim 1 in which the gap has a length of 60 to 100% of said dimension.

3. A process as claimed in claim 1 in which the decorative particles have a maximum size of up to 1 mm.

4. A process as claimed in claim 1 in which the gap has a maximum width which is 10 mm or the thickness of the article being made, whichever is the least.

5. A process of claim 4 in which the width of the gap is less than 5 mm.

6. A process as claimed in claim 1 in which the total amount of decorative particles is up to 400 parts by weight per 100 parts by weight of epoxy resin.

\* \* \* \* \*